United States Patent
Nakamura et al.

(10) Patent No.: US 8,957,658 B2
(45) Date of Patent: Feb. 17, 2015

(54) SWITCHING POWER-SUPPLY DEVICE

(71) Applicant: Sanken Electric Co., Ltd., Niiza-shi, Saitama (JP)

(72) Inventors: Masaru Nakamura, Saitama (JP); Takayuki Konishi, Saitama (JP); Chie Isshi, Saitama (JP); Satoshi Nakamoto, Saitama (JP); Jung Soo Lee, Saitama (JP); Hiroaki Nakamura, Saitama (JP)

(73) Assignee: Sanken Electric Co., Ltd., Niiza-shi, Saitama (JP)

( * ) Notice: Subject to any disclaimer, the term of this patent is extended or adjusted under 35 U.S.C. 154(b) by 92 days.

(21) Appl. No.: 13/755,811

(22) Filed: Jan. 31, 2013

(65) Prior Publication Data
US 2014/0210444 A1    Jul. 31, 2014

(51) Int. Cl.
*G05F 1/00* (2006.01)
*H02M 3/156* (2006.01)
*H02M 1/08* (2006.01)

(52) U.S. Cl.
CPC ............... *H02M 3/156* (2013.01); *H02M 1/08* (2013.01)
USPC ........................................................ 323/284

(58) Field of Classification Search
USPC .......................................... 323/282, 284–285
See application file for complete search history.

(56) References Cited

U.S. PATENT DOCUMENTS

| | | | | |
|---|---|---|---|---|
| 5,481,178 A | * | 1/1996 | Wilcox et al. | 323/287 |
| 5,627,460 A | * | 5/1997 | Bazinet et al. | 323/284 |
| 7,321,258 B2 | | 1/2008 | Wong et al. | |
| 2006/0273774 A1 | * | 12/2006 | Galinski, III | 323/288 |

* cited by examiner

*Primary Examiner* — Jue Zhang
(74) *Attorney, Agent, or Firm* — Banner & Witcoff, Ltd.

(57) ABSTRACT

A switching power-supply device includes a main switching element connected between a power-supply and an output terminal; a driving circuit that drives the main switching element; a capacitor that feeds power to the driving circuit; a charging circuit that charges the capacitor when the main switching element is switched from an on-state to an off-state; a switching control circuit that performs switching control of alternately switching the main switching element to the on-state and the off-state via the driving circuit; a voltage detection circuit that detects a voltage between both ends of the capacitor, and a driving control circuit that switches a state of prohibiting driving of the main switching element and a state of permitting driving of the main switching element, based on a difference between an output voltage output from the output terminal and a preset reference voltage and the voltage between both ends of the capacitor.

5 Claims, 6 Drawing Sheets

SWITCHING POWER-SUPPLY DEVICE

TECHNICAL FIELD

This disclosure relates to a switching power-supply device.

BACKGROUND ART

A switching power-supply device provided in a digital home electrical appliance such as television, recorder and the like is required to have low power consumption at the time of a light load such as remote control standby state. With respect to the demand for the low power consumption, in general, a time period for which driving of a switching element is prevented at the time of the light load is periodically provided to reduce switching loss and to implement the low power consumption (for example, refer to U.S. Pat. No. 5,481,178).

FIG. 5 illustrates an example of a configuration of a switching power-supply circuit according to the background art.

A switching power-supply circuit shown in FIG. 5 has an error amplifier 1, a feedback resistance 2, a switching control circuit 3, a switching operation control circuit 4b, a drive regulator circuit (DRVREG) 5, a diode 6, a bootstrap (BS) capacitor 7, an N-channel type MOSFET 8 serving as a main switching element, a driving circuit 9 driving the MOSFET 8, a current detection circuit 10, an inductor 13 and a capacitor 14 for voltage shaping, a freewheel diode 15, a regulator circuit (REG) 17 and a bias circuit 18b.

A drain terminal of the MOSFET 8 is connected to a power-supply 19 that supplies a power-supply voltage Vi. A gate terminal of the MOSFET 8 is connected to an output terminal of the driving circuit 9. A source terminal of the MOSFET 8 is connected to a terminal SW that is connected to one end of the bootstrap capacitor 7.

One of two power-supply terminals of the driving circuit 9 is connected to the terminal SW. The other of two power-supply terminals of the driving circuit 9 is connected to a terminal BS that is connected to the other end of the bootstrap capacitor 7.

The terminal BS is connected with a cathode of the diode 6. An anode of the diode 6 is connected with the drive regulator circuit 5.

The terminal SW is connected with a left end of the inductor 13. A right end of the inductor 13 is connected to an output terminal OT of the switching power-supply device.

The capacitor 14 and the feedback resistance 2 are connected between the output terminal OT and a ground, respectively.

A cathode of the freewheel diode 15 is connected between the left end of the inductor 13 and the source terminal of the MOSFET 8 and an anode of the freewheel diode 15 is connected to the ground.

The inductor 13 and the capacitor 14 configure a smoothing circuit, smooth a square wave voltage, which is generated by switching the MOSFET 8, and supply a direct current output voltage Vo to an output load circuit 16 connected to the output terminal OT.

The current detection circuit 10 detects a drain current iD that flows to the drain terminal of the MOSFET 8.

The drive regulator circuit 5 charges the bootstrap capacitor 7 through the diode 6, while the MOSFET 8 is switched from an on-state to an off-state and a regenerative current of the inductor 13 flows to the freewheel diode 15 (during the regenerative time period).

The bootstrap capacitor 7 feeds power to the driving circuit 9 while the MOSFET 8 is in the on-state.

The feedback resistance 2 is to detect the output voltage Vo that is output from the output terminal OT and is configured by two resistances connected in series between the output terminal OT and the ground. An input terminal of the error amplifier 1 is connected between the two resistances.

The error amplifier 1 has a differential amplifier circuit 11, a phase compensation circuit 12 and a power-supply that supplies a preset reference voltage VREF.

The error amplifier 1 generates an error amplification signal Vcomp that is obtained by amplifying a difference between the output voltage Vo detected through the feedback resistance 2 and the reference voltage VREF and outputs the error amplification signal Vcomp.

The switching control circuit 3 has an oscillator 31, a PWM latch 32, a PWM comparator 33, a resistance 34 and an AND circuit 36.

The oscillator 31 generates a pulse signal having constant period and pulse width and inputs the pulse signal to a set terminal S of the PWM latch 32.

The PWM comparator 33 compares a voltage signal Vtrip, which is obtained by current-voltage converting the drain current iD detected by the current detection circuit 10 by the resistance 34, and the error amplification signal Vcomp, which is output from the error amplifier 1, and outputs a signal according to a comparison result to a reset terminal R of the PWM latch 32.

Specifically, the PWM comparator 33 sets an output signal to be a high level when the voltage signal Vtrip is the error amplification signal Vcomp or larger. Also, the PWM comparator 33 sets an output signal to be a low level when the voltage signal Vtrip is smaller than the error amplification signal Vcomp.

When a high-level signal is input to the set terminal S, the PWM latch 32 sets an output signal to be a high level. The PWM latch 32 returns the output signal to a low level at the time that a high-level signal is input to the reset terminal R.

The switching operation control circuit 4b has a power-supply 41 that supplies a voltage of a threshold value VTH1 and a comparator 42.

The comparator 42 compares the error amplification signal Vcomp, which is output from the error amplifier 1, and the threshold value VTH1 and outputs a signal relating to a comparison result. Specifically, the comparator 42 sets an output signal (Light_Load) to be a high level when the error amplification signal Vcomp is below the threshold value VTH1. When the error amplification signal Vcomp is the threshold value VTH1 or larger, the comparator 42 sets the output signal (Light_Load) to be a low level.

The AND circuit 36 of the switching control circuit 3 is input with the output signal of the PWM latch 32 and a signal that is obtained by inverting the output signal of the comparator 42. When both the two input signals are the high-level, the AND circuit 36 controls the main switching element 8 to be the on-state via the driving circuit 9. When at least one of the two input signals is the low level, the AND circuit 36 controls the main switching element 8 to be the off-state via the driving circuit 9.

The regulator circuit (REG) 7 generates a regulator voltage VREG from the power-supply voltage Vi and supplies the regulator voltage VREG to the bias circuit 18b.

The bias circuit 18b is configured by a constant current circuit 180b in which a plurality of (six, in the example of FIG. 5) constant current sources is connected in parallel. The seven constant current sources generate bias currents i1, i2, i4, i5, i6, i7 from the regulator voltage VREG.

The bias current i1 is supplied to the comparator 42. The bias current i2 is supplied to the error amplifier circuit 11. The bias current i4 is supplied to the PWM comparator 33. The bias current i5 is supplied to the oscillator 31. The bias current i6 is supplied to the drive regulator circuit 5. The bias current i7 is supplied to the current detection circuit 10.

In the below, operations of the switching power-supply circuit shown in FIG. 5 are described with reference to a timing chart shown in FIG. 6.

In FIG. 6, "io" indicates a current that flows to the output load circuit 16. "SW" indicates a voltage of the terminal SW. "voltage between BS-SW" indicates a voltage (voltage between both ends of the bootstrap capacitor 7) between the terminal BS and the terminal SW. "icc" indicates a circuit current that flows to the regulator circuit 17.

At the start time of the operation, since the output voltage Vo=0 and the MOSFET 8 is in the off-state, the error amplification signal Vcomp becomes larger than the voltage signal Vtrip. Accordingly, the output of the PWM comparator 33 becomes a low level. The PWM latch 32 sets the output to be a high level when a high-level signal is input from the oscillator 31. Also, since the error amplification signal Vcomp is sufficiently larger than the threshold value VTH1, the output Light_Load of the comparator 42 becomes also a low level. That is, both two signals that are input to the AND circuit 36 are the high level and the MOSFET 8 becomes the on-state.

When the MOSFET 8 becomes the on-state, the drain current iD increases and the output voltage Vo rises. Accordingly, at certain timing, the voltage signal Vtrip reaches the same value as the error amplification signal Vcomp, the output signal of the PWM comparator 33 becomes a high level and the PWM latch 32 is reset. Thereby, the output of the AND circuit 36 becomes a low level and the MOSFET 8 becomes the off-state. When the MOSFET 8 becomes the off-state, since the drain current iD decreases, the output of the PWM comparator 33 becomes a low level. At this state, when a high-level signal is input to the PWM latch 32 from the oscillator 31, the output of the AND circuit 36 becomes a high level and the MOSFET 8 becomes again the on-state.

At a heavy load state where the output load current io flowing to the output load circuit 16 is high, the threshold value VTH1 is set so that the error amplification signal Vcomp is not smaller than the threshold value VTH1. Therefore, the output signal Light_Load becomes consistently a low level at the heavy load state. Accordingly, at the heavy load state, the switching control circuit 3 performs switching control of alternately switching the MOSFET 8 to the on-state and the off-state and determines time for which the MOSFET 8 becomes the on-state in accordance with the error amplification signal Vcomp.

On the other hand, when the output load current io decreases, the error amplification signal Vcomp starts to decrease, as shown in FIG. 6. As a result, the time period from when the MOSFET 8 becomes the on-state to when the voltage signal Vtrip reaches the level of the error amplification signal Vcomp is gradually shortened. Accordingly, the on-state time of the MOSFET 8 in the switching control is also shortened.

When the error amplification signal Vcomp becomes smaller than the threshold value VTH1, the output signal Light_Load becomes a high level, the output of the AND circuit 36 becomes a low level and the MOSFET 8 becomes the off-state. Thereby, the driving (switching control) of the MOSFET 8 by the switching control circuit 3 is prohibited.

When the output voltage Vo somewhat decreases after the driving of the MOSFET 8 is prohibited, the error amplification signal Vcomp turns to the increase, and when the error amplification signal Vcomp reaches the threshold value VTH1, the output signal Light_Load is switched to a low level. Thereby, the driving of the MOSFET 8 by the switching control circuit 3 is permitted. That is, the MOSFET 8 becomes the on-state at timing at which a high-level signal is input to the PWM latch 32 from the oscillator 31, and then the MOSFET 8 becomes the off-state at timing at which the levels of the error amplification signal Vcomp and the voltage signal Vtrip are the same.

When the driving of the MOSFET 8 is permitted and thus the MOSFET 8 becomes the on-state, the output voltage Vo slightly increases. After that, when the MOSFET 8 becomes the off-state, the output voltage Vo starts to decrease. As the output voltage Vo decreases, the error amplification signal Vcomp again starts to decrease. Then, when the error amplification signal Vcomp becomes again smaller than the threshold value VTH1, the output signal Light_Load becomes a high level and the driving of the MOSFET 8 by the switching control circuit 3 is again stopped.

Like this, at a light load state where the output load current io is small, the time period during which the driving of the MOSFET 8 is permitted, and the time period during which the driving of the MOSFET 8 is prohibited alternately repeat.

As the output load current io is smaller, the decrease of the output voltage Vo during the off-state of the MOSFET 8 becomes gentler. That is, as the load is lighter, the time period from when the error amplification signal Vcomp is smaller than the threshold value VTH1 to when the error amplification signal Vcomp again returns to the threshold value VTH1 becomes longer and the time period during which the driving of the MOSFET 8 is prohibited is prolonged. As a result, it is possible to reduce the switching loss to thus implement the low power consumption.

SUMMARY

However, during the off time period of the MOSFET 8, the charges of the bootstrap capacitor 7 are gradually discharged by a leakage current of the driving circuit 9. Accordingly, the longer the timer period during which the driving of the MOSFET 8 is prohibited, the more chargers of the bootstrap capacitor 7 are reduced.

For example, as shown in FIG. 6, at a ultra light load state, the voltage between both ends of the bootstrap capacitor 7 becomes smaller than a minimum voltage (operation lower limit voltage) necessary to drive the MOSFET 8 during the time period of prohibiting the driving of the MOSFET 8. As a result, it is not possible to resume the switching control, so that it is not possible to supply a voltage that is necessary at the time of the heavy load.

One of aspects of this disclosure has been made with considering the above situations, and an object thereof is to provide a switching power-supply device capable of implementing low power consumption at the time of a light load and supplying a desired voltage at the time of a heavy load.

A switching power-supply device according to one of aspects of this disclosure includes a main switching element connected between a power-supply and an output terminal; a driving circuit that drives the main switching element; a capacitor that feeds power to the driving circuit; a charging circuit that charges the capacitor when the main switching element is switched from an on-state to an off-state; a switching control circuit that performs switching control of alternately switching the main switching element to the on-state and the off-state via the driving circuit; a voltage detection circuit that detects a voltage between both ends of the capacitor, and a driving control circuit that switches a state of prohibiting driving of the main switching element and a state of permitting driving of the main switching element, based on a difference between an output voltage output from the output terminal and a preset reference voltage and the voltage between both ends of the capacitor.

According to one of aspects of this disclosure, it is possible to provide a switching power-supply device capable of implementing low power consumption at the time of a light load and supplying a desired voltage at the time of a heavy load.

DESCRIPTION OF ILLUSTRATIVE EMBODIMENTS

Figure 1:
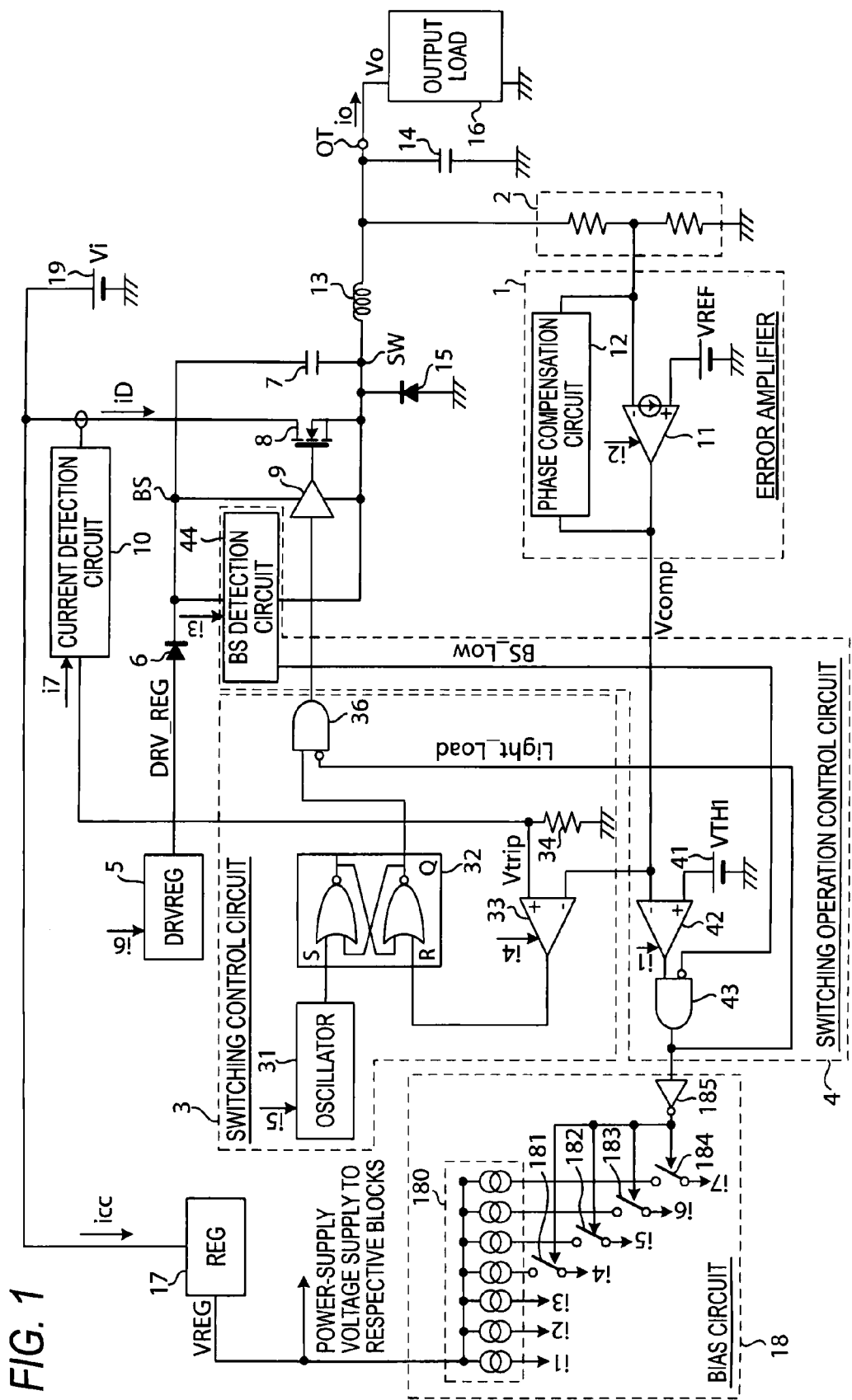
FIG. 1 illustrates an example of a configuration of a switching power-supply device for illustrating an exemplary illustrative embodiment.

FIG. 1 illustrates an example of a configuration of a switching power-supply device for illustrating an illustrative embodiment.

Figure 5:
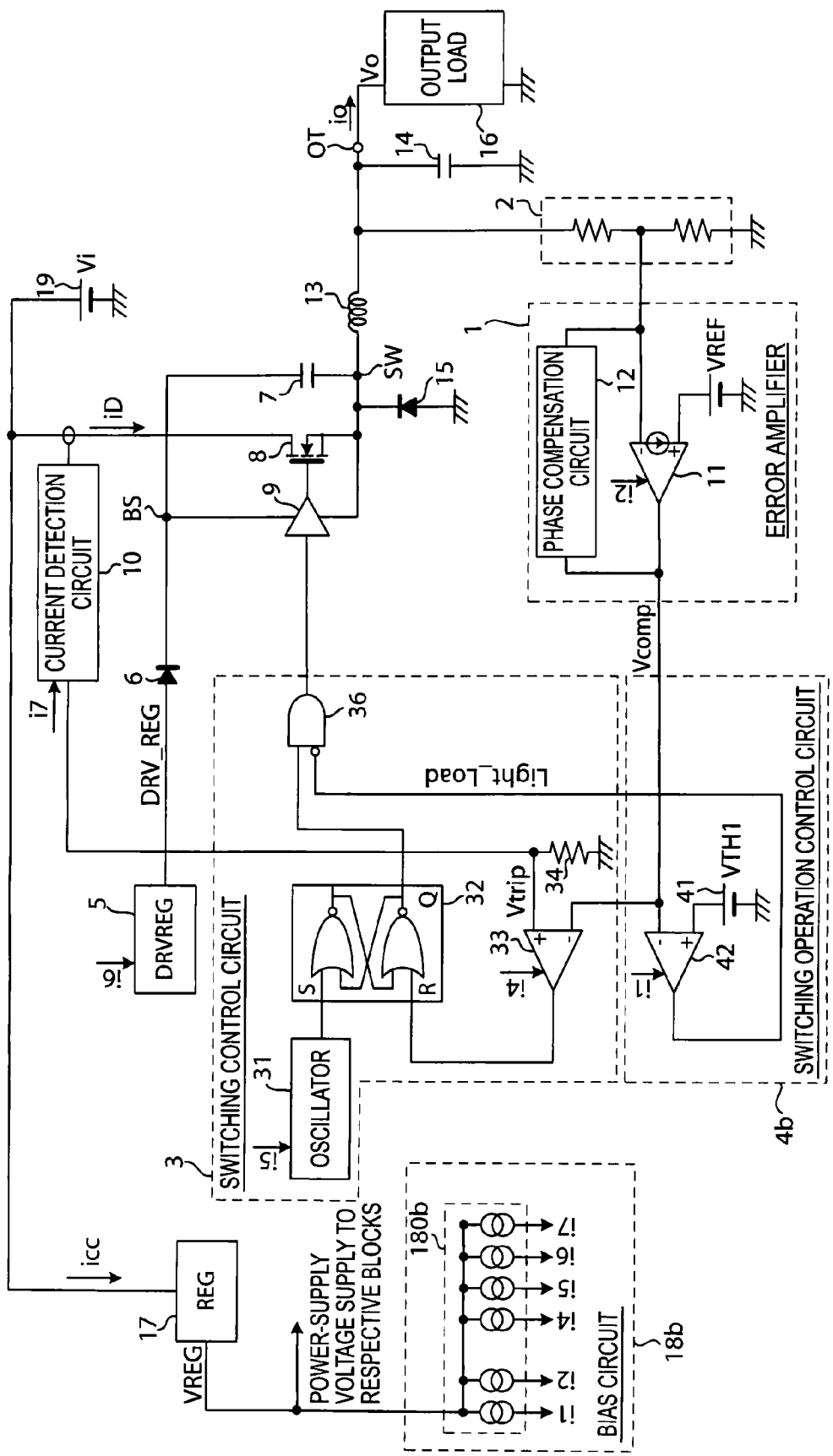
FIG. 5 illustrates an example of a configuration of a switching power-supply device of the background art.
Figure 6:
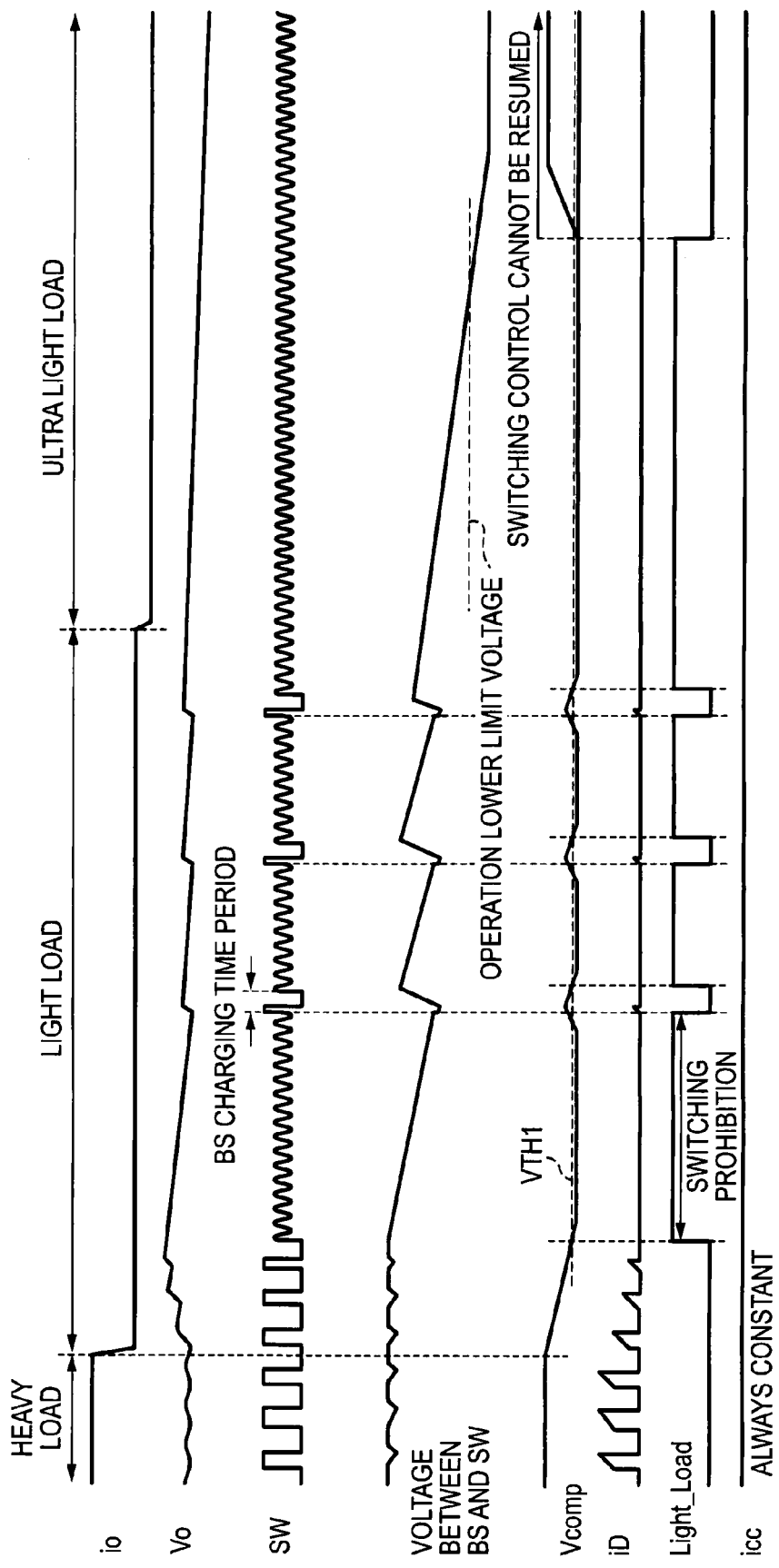
FIG. 6 is a timing chart for illustrating operations of the switching power-supply device shown in FIG. 5.

The switching power-supply device shown in FIG. 1 has the same configuration as that shown in FIG. 5, except that the switching operation control circuit 4b is changed to a switching operation control circuit (driving control circuit) 4 and the bias circuit 18b is changed to a bias circuit 18. Accordingly, the same constitutional elements as those of FIG. 5 are denoted with the same reference numerals and the descriptions thereof are omitted.

The switching operation control circuit 4 has a configuration where an AND circuit 43 and a BS detection circuit 44 are added to the switching operation control circuit 4b, an output signal (Light_Load) of the AND circuit 43 is input to the AND circuit 36 and an output signal (BS_Low) of the BS detection circuit 44 is input to the AND circuit 43.

The AND circuit 43 is input with an output signal of the comparator 42 and a signal that is obtained by inverting the signal (BS_Low) output from the BS detection circuit 44, respectively. Then, when both the two input signals are a high level, the AND circuit 43 sets the output signal Light_Load to be a high level, and when at least one of the two input signals is a low level, the AND circuit 43 sets the output signal Light_Load to be a low level. An output signal of the AND circuit 43 is input to not only the AND circuit 36 but also the bias circuit 18.

The bias circuit 18 has a constant current circuit 180 in which a plurality of (seven, in an example of FIG. 7) constant current sources is connected in parallel, switches 181 to 184 and a NOT circuit 185. The seven constant current sources generate bias currents i1, i2, i3, i4, i5, i6, i7 from the regulator voltage VREG.

The bias current i1 is supplied to the comparator 42. The bias current i2 is supplied to the differential amplifier circuit 11. The bias current i3 is supplied to the BS detection circuit 44. The bias current i4 is supplied to the PWM comparator 33. The bias current i5 is supplied to the oscillator 31. The bias current i6 is supplied to the drive regulator circuit 5. The bias current i7 is supplied to the current detection circuit 10.

The switch 181 is connected to the constant current source that generates the bias current i4. The switch 182 is connected to the constant current source that generates the bias current i5. The switch 183 is connected to the constant current source that generates the bias current i6. The switch 184 is connected to the constant current source that generates the bias current i7.

The NOT circuit 185 is input with the output signal (Light_Load) of the AND circuit 43 of the switching operation control circuit 4 and outputs an inverted signal of the input signal to the respective switches 181 to 184. The NOT circuit 185 closes the switches 181 to 184 when the output signal Light_Load is the low level and opens the switches 181 to 184 when the output signal Light_Load is the high level.

The BS detection circuit 44 detects a voltage between both ends of the bootstrap capacitor 7 and sets the output signal (BS_Low) to be a high level when the detected voltage becomes a threshold value VTH2 or smaller. The threshold value VTH2 is a value that is slightly larger than the minimum voltage that the driving circuit 9 needs so as to drive the MOSFET 8.

The BS detection circuit 44 returns the output signal (BS_Low) to the low level when the detected voltage becomes the threshold value VTH2 and then increases to a threshold value VTH3 larger than the threshold value VTH2.

Figure 2:
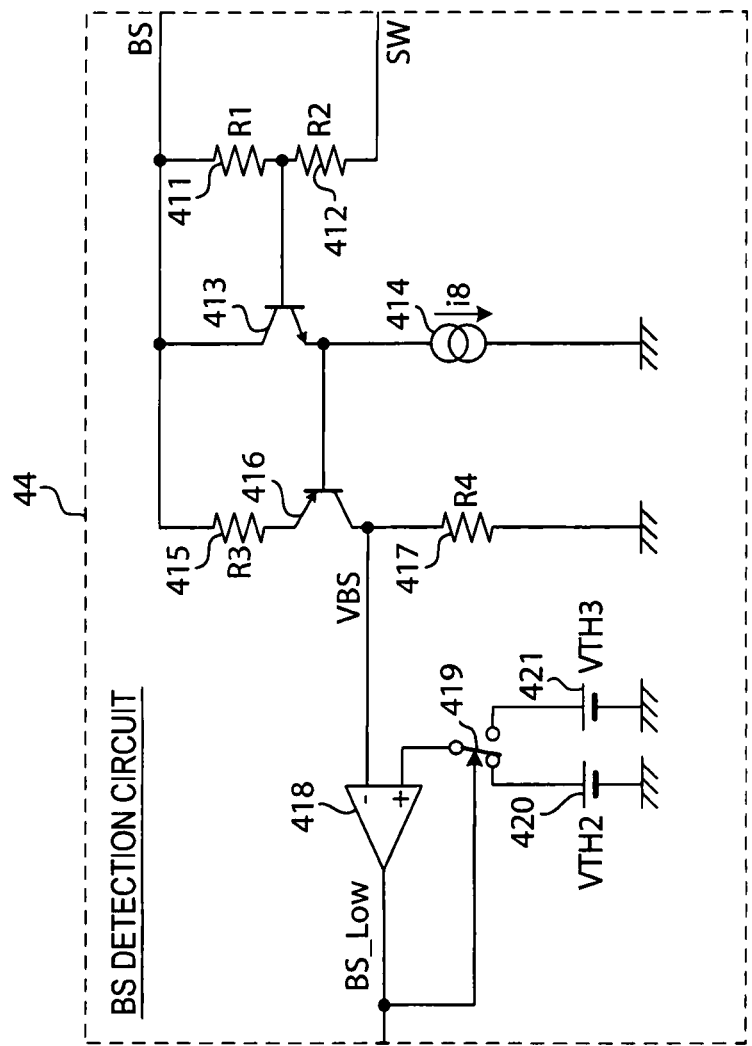
FIG. 2 illustrates an internal configuration of a BS detection circuit 44 shown in FIG. 1.

FIG. 2 illustrates an internal configuration of the BS detection circuit 44 shown in FIG. 1.

The BS detection circuit 44 has a buffer circuit configured by a resistance 411 having a resistance value R1 and a resistance 412 having a resistance value R2 for detecting the voltage between both ends of the bootstrap capacitor 7, an NPN transistor 413 and a constant current source 414, a level conversion circuit including a PNP transistor 416, a resistance 415 having a resistance value R3 and a resistance 417 having a resistance value R4, a comparator 418, a changeover switch 419, a power-supply 420 supplying a voltage of the threshold value VTH2 and a power-supply 421 supplying a voltage of the threshold value VTH3.

The voltage between both ends of the bootstrap capacitor 7, which is detected by the resistances 411, 412, is amplified in the buffer circuit and is level-changed in the level conversion circuit to be a voltage signal VBS, which is input to an inverting input terminal of the comparator 418.

The voltage signal VBS is expressed by a following equation where a voltage of one end of the bootstrap capacitor 7 is denoted as "BS" and a voltage of the other end of the bootstrap capacitor 7 is denoted as "SW", and is changed in proportion to the voltage between both ends of the bootstrap capacitor 7.

$$VBS = (BS - SW) \times \frac{R2 \times R4}{(R1 + R2) \times R3} \quad \text{[Equation 1]}$$

A non-inverting input terminal of the comparator 418 is connected with a fixed end of the changeover switch 419. The output signal BS_Low of the comparator 418 is input to the AND circuit 43 of the switching operation control circuit 4 of FIG. 1 and is also used as a control signal of the changeover switch 419.

A moveable end of the changeover switch 419 is connected to the power-supply 421 when the output signal BS_Low is a high level and is connected to the power-supply 420 when the output signal BS_Low is a low level.

In the below, operations of the switching power-supply circuit shown in FIG. 1 are described with reference to a timing chart shown in FIG. 3.

Figure 3:
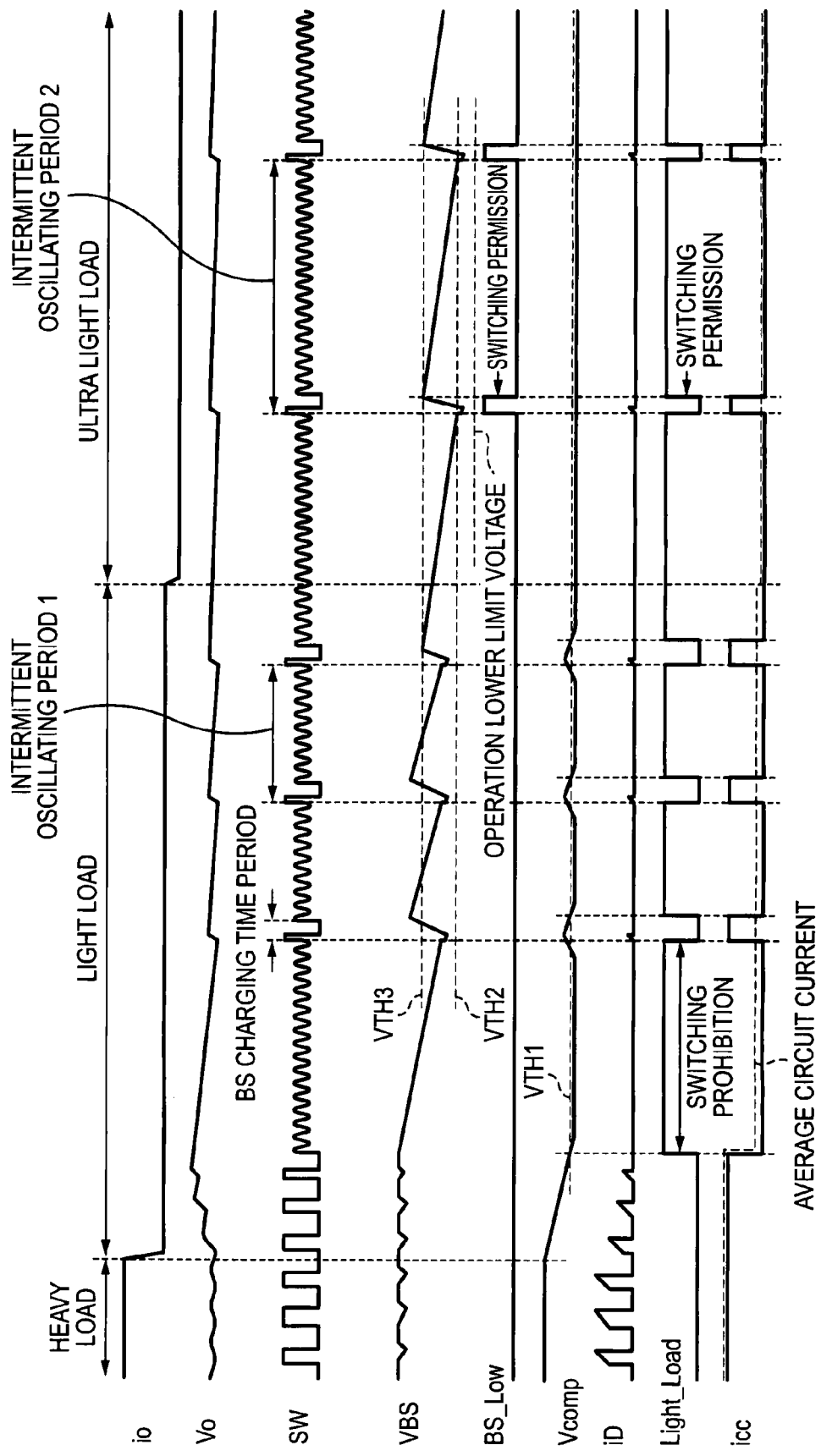
FIG. 3 is a timing chart for illustrating operations of the switching power-supply device shown in FIG. 1.

In FIG. 3, "io" indicates an output load current that flows to the output load circuit 16. "SW" indicates a voltage of the terminal SW. "icc" indicates a circuit current that is supplied to the regulator circuit 17.

At a heavy load state where the output load current io is high, the error amplification signal Vcomp is not smaller that the threshold value VTH1. Accordingly, at the heavy load state, the output signal Light_Load is always a low level. Therefore, at the heavy load state, like the switching operation control circuit shown in FIG. 5, the switching control circuit 3 performs the switching control of alternately switching the MOSFET 8 to the on-state and the off-state and determines time, for which the MOSFET 8 becomes the on-state, in accordance with the error amplification signal Vcomp. That is, when the error amplification signal Vcomp is the threshold value VTH1 or larger, it becomes a state that the driving (switching control) of the MOSFET 8 by the switching control circuit 3 is permitted.

On the other hand, when the output load current io decreases, the error amplification signal Vcomp starts to decrease, as shown in FIG. 3. As a result, the time period from when the MOSFET 8 becomes the on-state to when the voltage signal Vtrip reaches the level of the error amplification signal Vcomp is gradually shortened. Accordingly, the on-state time of the MOSFET 8 in the switching control is also shortened.

When the error amplification signal Vcomp becomes smaller than the threshold value VTH1, the output signal Light_Load becomes a high level. Thereby, the MOSFET 8 becomes the off-state and the switches 181 to 184 of the bias circuit 18 become off. Accordingly, the driving of the MOSFET 8 by the switching control circuit 3 is prohibited, and the supply of the bias current necessary for the switching control is stopped.

After the driving of the MOSFET 8 is prohibited, the voltage signal VBS starts to drop, as shown in FIG. 3. Also, after the driving of the MOSFET 8 is prohibited, the output voltage Vo starts to decrease. When the output voltage decreases somewhat, the error amplification signal Vcomp turns to increase. When the error amplification signal Vcomp reaches the threshold value VTH1, the output signal Light_Load is switched to a low level. Thereby, the driving of the MOSFET 8 by the switching control circuit 3 is permitted. That is, the MOSFET 8 becomes the on-state at timing at which a high-level signal is input to the PWM latch 32 from the oscillator 31, and then the MOSFET 8 becomes the off-state at timing at which the levels of the error amplification signal Vcomp and the voltage signal Vtrip are the same.

When the driving of the MOSFET 8 is permitted, the MOSFET 8 becomes the on-state, so that the output voltage Vo slightly increases. After that, when the MOSFET 8 becomes the off-state, the output voltage Vo starts to decrease. As the output voltage Vo decreases, the error amplification signal Vcomp again starts to decrease. Then, when the error amplification signal Vcomp becomes again smaller than the threshold value VTH1, the output signal Light_Load becomes a high level, and the driving of the MOSFET 8 by the switching control circuit 3 is again prohibited.

At a light load state, the error amplification signal Vcomp increases to the threshold value VTH1 before a level of the voltage signal VBS decreases to the threshold value VTH2 after the error amplification signal Vcomp becomes smaller than the threshold value VTH1, and the driving of the MOSFET 8 is thus prohibited. Accordingly, as the error amplification signal Vcomp is changed, the time periods, during which the driving of the MOSFET 8 is prohibited and the driving of the MOSFET 8 is permitted, alternately repeat.

However, when the output load current io becomes smaller from the light load state and becomes a ultra light load state, the decrease of the output voltage Vo during the time period of prohibiting the driving of the MOSFET 8 becomes gentle. Therefore, after the error amplification signal Vcomp becomes smaller than the threshold value VTH1 and the driving of the MOSFET 8 is thus prohibited, a level of the voltage signal VBS is dropped to the threshold value VTH2 before the error amplification signal Vcomp reaches the threshold value VTH1.

When the voltage signal VBS becomes the threshold value VTH2, the output signal BS_Low becomes a high level, a connection destination of the changeover switch 419 in FIG. 2 is changed to the power-supply 421, the output Light_Load of the AND circuit 43 becomes a low level and the driving of the MOSFET 8 by the switching control circuit 3 is resumed. At this time, the voltage between both ends of the bootstrap capacitor 7 is higher than the operation lower limit voltage. Therefore, it is possible to resume the switching control 10 of the MOSFET 8 without any problem.

When the switching control is resumed, the bootstrap capacitor 7 is charged by the drive regulator circuit 5 at the time that the MOSFET 8 is changed from the on-state to the off-state. Therefore, the voltage signal VBS increases. According to the increase, when the voltage signal VBS becomes the threshold value VTH3, the output signal BS_Low becomes a low level, the connection destination of the changeover switch 419 in FIG. 2 is changed to the power-supply 420 and the output Light_Load of the AND circuit 43 becomes a high level. Thereby, the driving of the MOSFET 8 is again prohibited and the switches 181 to 184 of the bias circuit 18 become off, so that the unnecessary supply of the bias current is stopped.

Thereafter, the above operations are repeatedly performed.

As described above, at the state where the error amplification signal Vcomp is lower than the threshold value VTH1 (the state where the driving of the MOSFET 8 is prohibited), when the voltage signal VBS corresponding to the voltage between both ends of the bootstrap capacitor 7 becomes the threshold value VTH2 or smaller, the switching power-supply device of FIG. 1 permits the driving of the MOSFET 8, irrespective of the level of the error amplification signal Vcomp. Since the driving of the MOSFET 8 is permitted, the voltage signal VBS can be made to be larger than the threshold value VTH2 by the switching control. Therefore, when the error amplification signal Vcomp exceeds the threshold value VTH1 later, it is possible to normally operate the driving circuit 9 to resume the switching control.

Like this, the switching power-supply device of FIG. 1 determines whether to prohibit the driving of the MOSFET 8 or to permit the driving of the MOSFET 8, based on the error amplification signal Vcomp and the voltage between both ends of the bootstrap capacitor 7. Accordingly, it is possible to suppress the case where the voltage between both ends of the bootstrap capacitor 7 is too low and the switching control cannot be thus performed, like the switching power-supply device of the background art shown in FIG. 5. Also, even when the switching power-supply device returns to the heavy load state, the switching power-supply device can be operated normally.

Also, according to the switching power-supply device of FIG. 1, as the output load current io is smaller, the time period from when the driving of the MOSFET 8 is permitted to when the driving of the MOSFET 8 is permitted next time (the intermittent oscillating periods 1, 2 shown in FIG. 3), is prolonged. That is, since the time period, during which the driving of the MOSFET 8 is prohibited, is prolonged, it is possible to reduce the switching loss and to thus decrease the power consumption at the lower load.

Also, while the driving of the MOSFET 8 is being prohibited, the switching power-supply device of FIG. 1 turns off the switches 181 to 184 of the bias circuit 18 to thus stop the supply of the bias current to the PWM comparator 33, the oscillator 31, the drive regulator circuit 5 and the current detection circuit 10. Therefore, an average value (average circuit current) of the current icc flowing into the regulator circuit 18 is as shown in FIG. 3, and it is possible to reduce the power consumption, compared to the switching power-supply device of FIG. 5 where the average circuit current is always constant.

Also, the switching power-supply device of FIG. 1 charges the bootstrap capacitor 7 during the time period of prohibiting the driving of the MOSFET 8 by temporarily permitting the driving of the MOSFET 8 without using a separate device for charging the bootstrap capacitor 7. Accordingly, compared to a configuration where a separate device for charging the bootstrap capacitor 7 is used, it is possible to reduce the cost and a circuit area because the separate device is not necessary.

Also, according to the switching power-supply device of FIG. 1, since it is possible to continue the switching control without increasing a capacity of the bootstrap capacitor 7, it is possible to reduce the cost and the circuit area.

As the threshold value VTH3 is larger, the time period permitting the driving of the MOSFET 8 in the time period, during which the error amplification signal Vcomp is lower than the threshold value VTH1, is prolonged and the power consumption is correspondingly increased. Meanwhile, when the threshold value VTH3 is too small, the time period from when the voltage signal VBS reaches the threshold value VTH3 to when it is dropped to the threshold value VTH2 is shortened and the time period from when the driving of the MOSFET 8 is permitted to when the driving of the MOSFET 8 is permitted later (the intermittent oscillating period 2) is shortened, so that the power consumption is increased. Therefore, the threshold value VTH3 is preferably set to be an appropriate value, which is not too large and not too small so that the power consumption can be reduced as much as possible.

Also, the switching power-supply device of FIG. 1 turns off the switches 181 to 184 of the bias circuit 18 during the time period of prohibiting the driving of the MOSFET 8. However, all the switches 181 to 184 may not turn off. When the supply of the bias current to the drive regulator circuit 5 and PWM comparator 33 having the particularly high power consumption of the PWM comparator 33, the oscillator 31, the drive regulator circuit 5 and the current detection circuit 10, which are necessary for the switching control, is stopped, it is possible to effectively reduce the power consumption. Also, the bias current may not be completely stopped. For example, when the bias current that is supplied during the time period of prohibiting the driving of the MOSFET 8 is made to be relatively smaller than that of the time period of permitting the driving of the MOSFET 8, it is possible to implement the low power consumption.

Also, in the switching power-supply device of FIG. 1, the switches 181 to 184 and the NOT circuit 185 in the bias circuit 18 may be omitted, and the bias currents i1 to i7 may be supplied to the supply destination all the time. Also in this configuration, it is possible to normally perform the switching control when the switching power-supply device returns to the heavy load state from the light load state.

In the below, a modified embodiment of the switching power-supply device shown in FIG. 1 is described.

Figure 4:
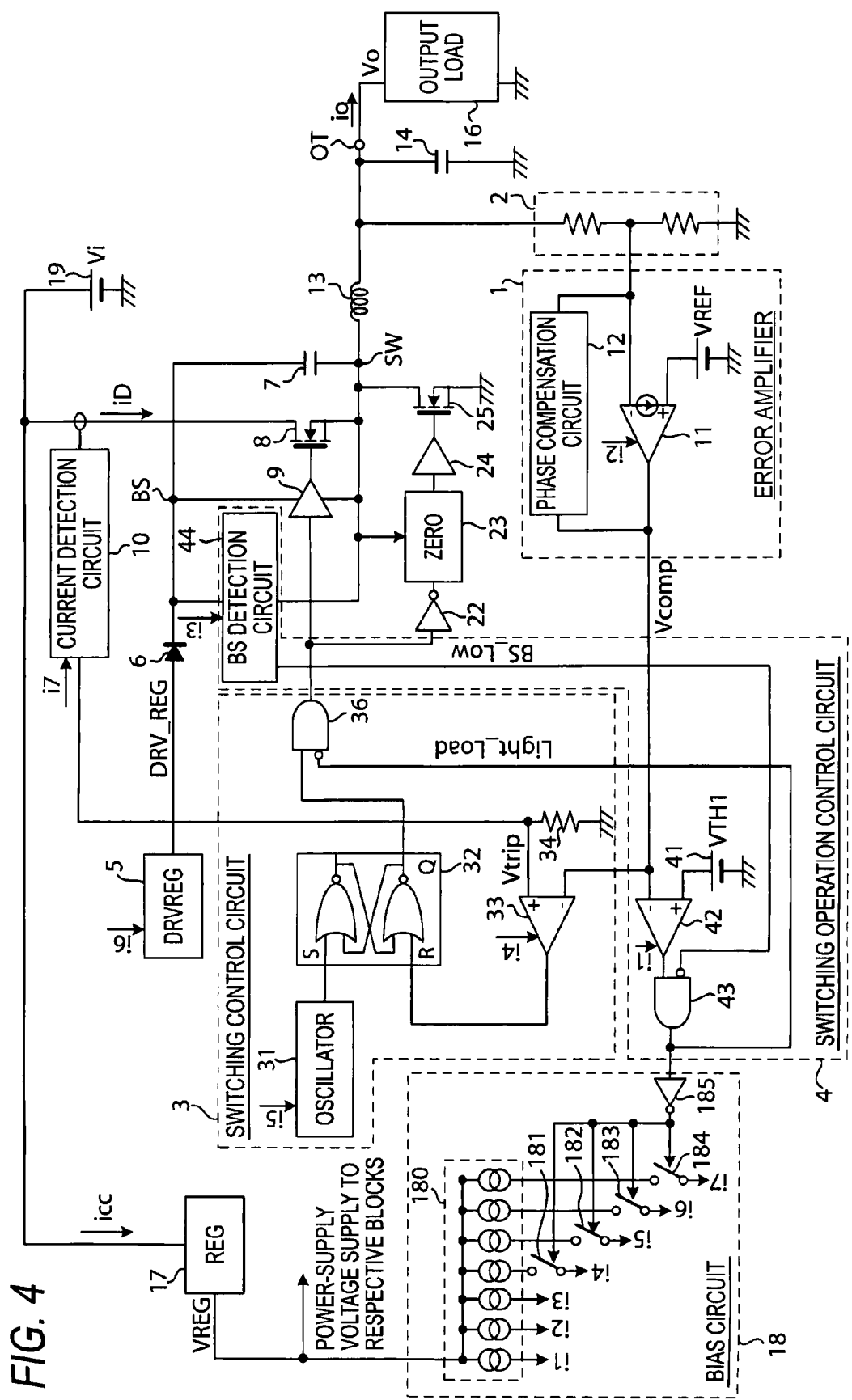
FIG. 4 illustrates a modified embodiment of the configuration of the switching power-supply device shown in FIG. 1.

FIG. 4 illustrates a modified embodiment of the switching power-supply device shown in FIG. 1. The switching power-supply device shown in FIG. 4 is the same as the switching power-supply device shown in FIG. 1, except that the freewheel diode 15 is omitted and a NOT circuit 22, a zero cross detection circuit (ZERO) 23, a driving circuit 24 and an N-channel type MOSFET 25, which is a sub-switching element, are added.

The MOSFET 25 has a drain terminal that is connected to the terminal SW and a source terminal that is connected to the ground.

The driving circuit 24 is a circuit that drives the MOSFET 25 and controls a gate voltage of the MOSFET 25 in response to a signal that is input from the zero cross detection circuit 23.

The NOT circuit 22 inputs a signal, which is obtained by inverting an output signal of the AND circuit 36, to the zero cross detection circuit 23.

The zero cross detection circuit 23 controls the MOSFET 25 to be the on-state via the driving circuit 24 when the signal input from the NOT circuit 22 is a high level. Also, the zero cross detection circuit 23 controls the MOSFET 25 to be the off-state via the driving circuit 24 when the signal input from the NOT circuit 22 is a low level.

Also, when the MOSFET 25 is switched from the off-state to the on-state, the zero cross detection circuit 23 detects ending timing of a regenerative time period of the inductor 13, based on the voltage of the terminal SW. When it is detected that the regenerative time period of the inductor 13 is over, the zero cross detection circuit 23 controls the MOSFET 25 to be the off-state.

According to the modified embodiment shown in FIG. 4, it is possible to considerably reduce the power loss, which is caused during the regenerative time period of the inductor 13, compared to the configuration where the freewheel diode 15 is used. Accordingly, it is possible to further lower the power consumption.

As described above, the specification discloses following aspects.

(1) A switching power-supply device includes a main switching element connected between a power-supply and an output terminal; a driving circuit that drives the main switching element; a capacitor that feeds power to the driving circuit; a charging circuit that charges the capacitor when the main switching element is switched from an on-state to an off-state; a switching control circuit that performs switching control of alternately switching the main switching element to the on-state and the off-state via the driving circuit; a voltage detection circuit that detects a voltage between both ends of the capacitor; and a driving control circuit that switches a state of prohibiting driving of the main switching element and a state of permitting driving of the main switching element, based on a difference between an output voltage output from the output terminal and a preset reference voltage and the voltage between both ends of the capacitor.

(2) In the switching power-supply device of the above (1), the driving control circuit permits the driving of the main switching element when the difference is a first threshold value or larger and when the voltage between both ends of the capacitor is a second threshold value or smaller.

(3) In the switching power-supply device of the above (2), at a state where the difference is smaller than the first threshold value, after the voltage between both ends of the capacitor is the second threshold value or smaller and thus the driving of the main switching element is permitted, the driving control circuit prohibits the driving of the main switching element when the voltage between both ends of the capacitor reaches a third threshold value larger than the second threshold value.

(4) The switching power-supply device of the above (3) further includes a current control circuit that reduces a current, which is supplied to the switching control circuit and the charging circuit during a time period of prohibiting the driving of the main switching element, compared to a current that is supplied during a time period of permitting the driving of the main switching element.

(5) The switching power-supply device of the above (4) further includes an inductor for voltage shaping that is connected between the main switching element and the output terminal; a sub-switching element that is connected between a line between the main switching element and the inductor and a ground, and an element driving circuit that turns on the sub-switching element when the main switching element is in the off-state during the time period of permitting the driving of the main switching element.

(6) The switching power-supply device of the above (1) further includes a current control circuit that reduces a current, which is supplied to the switching control circuit and the charging circuit during a time period of prohibiting the driving of the main switching element, compared to a current that is supplied during a time period of permitting the driving of the main switching element.

(7) The switching power-supply device of the above (1) further includes an inductor for voltage shaping that is connected between the main switching element and the output terminal, a sub-switching element that is connected between a line between the main switching element and the inductor and a ground, and an element driving circuit that turns on the sub-switching element when the main switching element is in the off-state during the time period of permitting the driving of the main switching element.

The invention claimed is:

1. A switching power-supply device comprising:
    a main switching element connected between a power-supply and an output terminal;
    a driving circuit configured to drive the main switching element;
    a capacitor configured to feed power to the driving circuit;
    a charging circuit configured to charge the capacitor when the main switching element is switched from an on-state to an off-state;
    a switching control circuit configured to perform switching control, the switching control including alternately switching the main switching element between the on-state and the off-state via the driving circuit;
    a voltage detection circuit configured to detect a voltage between both ends of the capacitor; and
    a driving control circuit configured to switch between a state of prohibiting driving of the main switching element and a state of permitting driving of the main switching element, based on a difference between an output voltage output from the output terminal and a preset reference voltage, and based on the voltage between both ends of the capacitor,
    wherein the driving control circuit permits the driving of the main switching element when the difference is greater than or equal to a first threshold value and when the voltage between both ends of the capacitor is less than or equal to a second threshold value, and
    wherein, in a state where the difference is smaller than the first threshold value, and after permitting the driving of the main switching element based on the voltage between both ends of the capacitor being less than or equal to the second threshold value, the driving control circuit prohibits the driving of the main switching element when the voltage between both ends of the capacitor reaches a third threshold value larger than the second threshold value.

2. The switching power-supply device according to claim 1, further comprising:
    a current control circuit configured to reduce a current, which is supplied to the switching control circuit and the charging circuit during a time period of prohibiting the driving of the main switching element, relative to a current that is supplied during a time period of permitting the driving of the main switching element.

3. The switching power-supply device according to claim 2, further comprising:
    an inductor configured to shape voltage, the inductor connected between the main switching element and the output terminal;
    a sub-switching element that is connected between a line between the main switching element and the inductor and a ground; and
    an element driving circuit configured to turn on the sub-switching element when the main switching element is in the off-state during the time period of permitting the driving of the main switching element.

4. The switching power-supply device according to claim 1, further comprising:
    a current control circuit configured to reduce a current, which is supplied to the switching control circuit and the charging circuit during a time period of prohibiting the driving of the main switching element, relative to a current that is supplied during a time period of permitting the driving of the main switching element.

5. The switching power-supply device according to claim 1, further comprising:
    an inductor configured to shape voltage, the inductor being connected between the main switching element and the output terminal;
    a sub-switching element that is connected between a line between the main switching element and the inductor and a ground; and
    an element driving circuit configured to turn on the sub-switching element when the main switching element is in the off-state during a time period of permitting the driving of the main switching element.

* * * * *